Jan. 17, 1939.  A. W. BENDER  2,144,252
VEHICLE
Filed Feb. 11, 1936
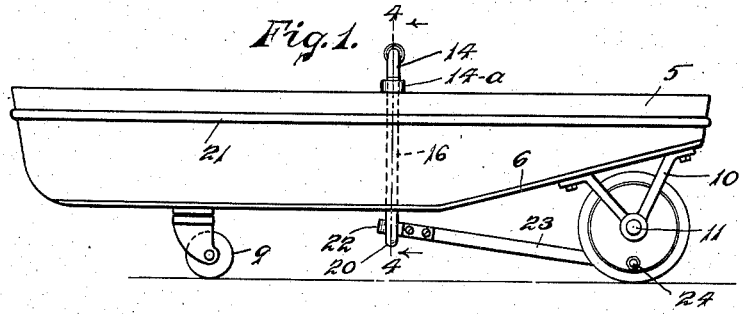
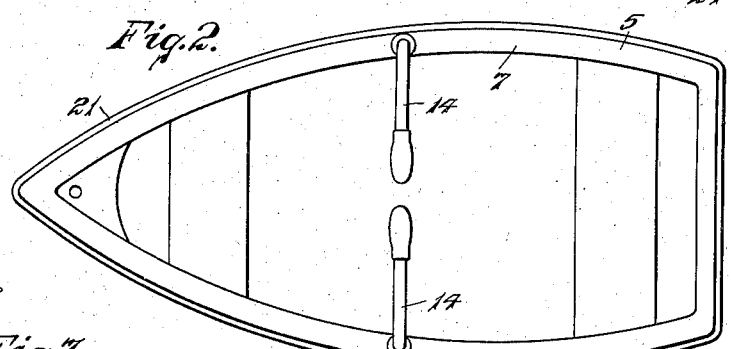
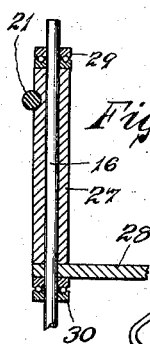
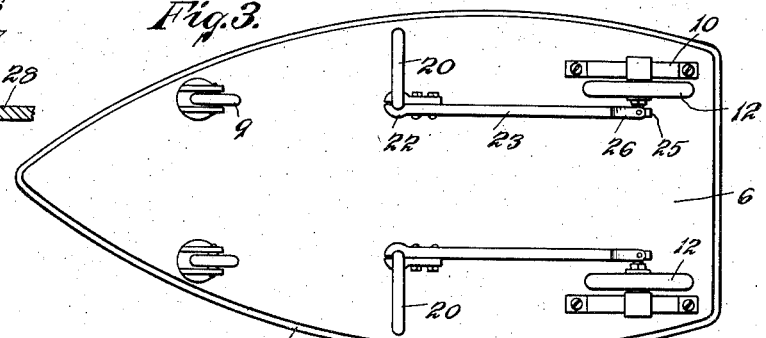
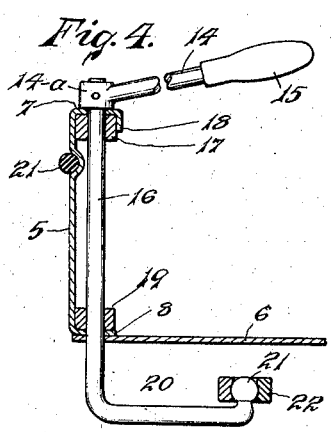
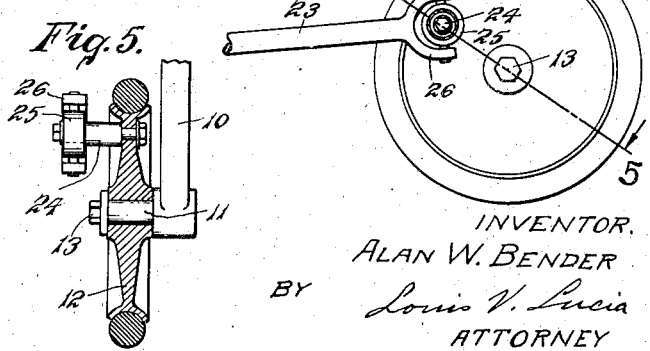
INVENTOR.
ALAN W. BENDER
BY Louis V. Lucia
ATTORNEY Patented Jan. 17, 1939

2,144,252

UNITED STATES PATENT OFFICE 2,144,252

VEHICLE

Alan W. Bender, Hartford, Conn.

Application February 11, 1936, Serial No. 63,336

1 Claim. (Cl. 280—1.11)

This invention relates to vehicles and has for an object thereof, the provision of a vehicle having the appearance of a row boat and which may be propelled, by the action of an occupant, as in rowing.

A further object of the invention is to provide a novel mechanism which is simple in construction, highly efficient, non-obstructive to the occupant in the use of the vehicle, and whereby a maximum amount of safety is provided to the occupant in the operation of the vehicle.

The embodiment of the invention is illustrated in the accompanying drawing and resides in certain novel features as described in the following specification and defined in the claim thereof.

In the drawing:—

Figure 1 is a side view in elevation of a vehicle constructed according to the present invention.

Figure 2 is a top plan view of the same.

Figure 3 is a bottom plan view.

Figure 4 is a view in vertical section on an enlarged scale on line 4—4 of Figure 1.

Figure 5 is a view in central vertical section through one of the driving wheels of the vehicle.

Figure 6 is a side view thereof.

Figure 7 is a view in central vertical section illustrating a modification of the invention.

As illustrated in the drawing, the vehicle comprises a body which is preferably of sheet metal construction and has side members 5, and a bottom 6 which is preferably turned upwardly at the rear of the vehicle as clearly shown in Figure 1.

The said side members are bent inwardly forming gunwales 7 at the top, and flanges 8 at the bottom, to which the bottom of the vehicle is secured as clearly illustrated in Figure 4.

On the under side of the bottom, near the front end of the vehicle and at opposite sides of the medial longitudinal line thereof, are mounted small rollers, or casters, 9.

Near the extreme end of the body, at the rear thereof, are secured brackets 10 which are provided with axle members 11 on which are rotatably mounted the driving wheels 12. The said wheels are retained on the said axles in a suitable manner such as by means of bolts 13.

The propelling mechanism for the vehicle consists of a pair of levers 14 which are provided with handles 15 and attached to operating bars 16 by means of a hub 14—a. Each of the said bars extends through the gunwale 7, at each top of the side 5, and is rotatably mounted therein in a durable manner by means of a bearing 17 which is secured to the under side of the said gunwale. The said hub 14—a serves as a supporting bearing for sustaining the weight of the operating bar upon the upper surface of the gunwale. The inner edge of the gunwale is turned downwardly, as at 18, to present a smooth surface at the inside of the vehicle. The lower portion of each of the operating bars 16 is supported in a bearing 19 which is mounted upon the flange 8 of the sides 5. The lower end portion 20 of each of the said operating bars, extends below the bottom of the vehicle, towards the center thereof, and terminates in a ball 21 at its end, to which is secured a ball socket member 22 of the pitman 23. The said pitman extends from the said operating lever to a crank pin 24 which is secured to the wheels 12 as clearly shown in Figures 5 and 6.

The said pitman is secured to the said crank pin by means of a suitable ball bearing 25 which is mounted upon the crank pin and swivelly attached to a fork 26 extending from the end of the pitman.

If desired, the vehicle may be constructed of wood as illustrated in Figure 7 of the drawing, in which the numeral 27 denotes the side of the vehicle and 28 the bottom thereof. The objects of this invention, namely, the elimination of obstructing members, may be obtained in this modified form of construction by housing the operating bar 16 in the said sides 27 and supporting the same by a suitable ball bearing 29, resting upon the top of the said side, and a similar bearing 30 secured to the bottom 28.

Near the top edge of the sides and the back of the vehicle, is provided a groove 31 in which is secured a band of rubber or other suitable yieldable material, to provide a buffer 32 for the vehicle and also lend an attractive appearance thereto.

It will be noted that the said invention, as illustrated in the drawing, provides a driving mechanism for a vehicle, such as a land dory, which is contained entirely within the contour of said vehicle. This element of the invention is of particular advantage inasmuch as it eliminates the objection to any parts that would project outside of said vehicle and which could strike near objects and possibly cause accidents to the occupant as well as damage to the vehicle while said vehicle is in motion.

Furthermore, the novel construction of the driving mechanism provided by this invention eliminates any parts which would otherwise extend on the inside of the vehicle and in the way of the occupant.

The operation of the device illustrated is as follows:

When travel of the vehicle is to be effected, the occupant grasps the handles 15 on the levers 14 and oscillates them forwardly and backwardly, corresponding movements being thereby set up in the crank arms so that the pitmen 23 will be caused to reciprocate and effect rotation of the wheels 12.

Assuming the wrist pins to be above the horizontal plane of the wheel axles 11, a push on the levers will produce a pull through the pitmen to rotate the wheels and, if the wrist pins be below the axles, the pull on the levers will cause the pitmen to push the levers with the same ultimate result.

During the interval occupied in reversing the stroke, the momentum of the wheels will carry the wrist pins over the dead center so that the progress of the vehicle will be continuous and easily maintained. The vehicle may be in any desired size and is especially desirable in small sizes for the amusement and development of children who will quickly learn to successfully operate it.

The vehicle may be easily steered to one side by pulling on one lever and pushing on the other lever since the forward casters 9 will conform with the direction of the vehicle inasmuch as they are swiveled thereto and may swing freely to either side.

I claim:

A vehicle comprising a body of sheet metal construction simulating a body and comprising a bottom, side members each having a flange turned inwardly relative to said body and whereby the said side members are connected to said bottom, a flange at the top of said side members turned inwardly to form a gunwale, a flange depending downwardly from the inner edge of said gunwale, means comprising a bearing mounted underneath said gunwale and between said depending flange and side members, a separate bearing, operating bars extending through said bottom and flanges and each rotatable in said bearings, a lever connected to each of said operating bars comprising means for supporting the said operating bars upon the top of said gunwales, wheels upon which said body is supported, and means connecting said operating bars with said wheels for driving the same.

ALAN W. BENDER.